US006604236B1

(12) United States Patent
Draper et al.

(10) Patent No.: US 6,604,236 B1
(45) Date of Patent: Aug. 5, 2003

(54) SYSTEM AND METHOD FOR GENERATING FILE UPDATES FOR FILES STORED ON READ-ONLY MEDIA

(75) Inventors: Stephen Peter Willis Draper, Hants (GB); Brian James Collins, Surrey (GB); Patrick Terence Falls, Berkshire (GB)

(73) Assignee: iOra, Ltd. (GB)

( * ) Notice: Subject to any disclaimer, the term of this patent is extended or adjusted under 35 U.S.C. 154(b) by 0 days.

(21) Appl. No.: 09/340,411

(22) Filed: Jun. 28, 1999

Related U.S. Application Data

(60) Provisional application No. 60/091,291, filed on Jun. 30, 1998.

(51) Int. Cl.[7] ................................................. G06F 9/45
(52) U.S. Cl. ........................................................ 717/170
(58) Field of Search ............................ 717/11, 170, 173

(56) References Cited

U.S. PATENT DOCUMENTS

| | | | |
|---|---|---|---|
| 5,001,628 A | 3/1991 | Johnson et al. ................ 707/10 |
| 5,008,814 A | 4/1991 | Mathur ........................ 709/221 |
| 5,113,519 A | 5/1992 | Johnson et al. ............. 707/201 |
| 5,151,989 A | 9/1992 | Johnson et al. ................ 707/10 |
| 5,155,847 A | 10/1992 | Kirouac et al. ................ 717/11 |
| 5,212,789 A | 5/1993 | Rago ............................. 707/8 |
| 5,276,871 A | 1/1994 | Howarth ...................... 707/201 |
| 5,278,979 A | 1/1994 | Foster et al. ................. 707/203 |

(List continued on next page.)

FOREIGN PATENT DOCUMENTS

| JP | 04-242829 | * | 8/1992 | ............. G06F/9/06 |
|---|---|---|---|---|
| JP | 4-242829 | * | 8/1992 | ............. G06F/9/06 |
| JP | 05-091550 | * | 4/1993 | ............. G06F/9/06 |

Primary Examiner—Kakali Chaki
Assistant Examiner—John Q. Chavis
(74) Attorney, Agent, or Firm—Meyertons, Hood, Kivlin, Kowert & Goetzel, P.C.; Eric B. Meyertons

(57) ABSTRACT

A method and system of the present invention generates a representation of a new version of an original file system with reference to the original file system and the new version of the file system. Use of data from previous versions of the file system reduces the amount of data to be stored in the delta directory map file, delta modification data block file, and delta look up table generated for the data portions unique to the newest version of an original file system. The inventive process produces delta data block records that identify the location of data portions that may be used to generate the newest version of the file system. The data portions may be located in a file in the original file system, a delta modification data block file in a previous version of the original file system or a delta modification data block file for the newest version of the original file system.

The method of the present invention is performed by generating a basis index table identifying the data content of an original file system, generating a file of modification data blocks that may be used to modify the data content of the original file system, and generating a delta look up table that identifies the location of the data blocks used to represent the newest version of the original file system. The delta look up table and the file of modification data blocks may be stored for delivery to a computer on which a copy of the original file system is stored. The delta look up table and the file of modification data blocks are then used by the computer system on which a copy of the original file system is stored to provide the data content for a new version of the original file system. This is done in way that appears to provide a single file system containing the new version of the file system. Thus, the method of the present invention may be used to generate data for updating the content of a copy of the original file system without having to generate a copy of every file and data block for the new content of the original file system.

164 Claims, 7 Drawing Sheets

U.S. PATENT DOCUMENTS

| | | | |
|---|---|---|---|
| 5,278,982 A | 1/1994 | Daniels et al. | 707/202 |
| 5,313,646 A | 5/1994 | Hendricks et al. | 707/201 |
| 5,317,728 A | 5/1994 | Tevis et al. | 707/204 |
| 5,325,524 A | 6/1994 | Black et al. | 707/10 |
| 5,347,653 A | 9/1994 | Flynn et al. | 707/203 |
| 5,355,476 A | 10/1994 | Fukumura | 707/1 |
| 5,377,326 A | 12/1994 | Murata et al. | 707/228 |
| 5,390,335 A | 2/1995 | Stephan et al. | 709/221 |
| 5,403,639 A | 4/1995 | Belsan et al. | 707/204 |
| 5,418,957 A | 5/1995 | Narayan | 717/1 |
| 5,434,994 A | 7/1995 | Shaheen et al. | 707/201 |
| 5,546,539 A | 8/1996 | Poling | 707/201 |
| 5,581,740 A * | 12/1996 | Jones | 711/112 |
| 5,644,782 A | 7/1997 | Yeates et al. | 707/10 |
| 5,721,907 A | 2/1998 | Pyne | 707/10 |
| 5,729,743 A | 3/1998 | Squibb | 707/203 |
| 5,745,906 A | 4/1998 | Squibb | 707/203 |
| 5,752,005 A | 5/1998 | Jones | 703/22 |
| 5,757,669 A | 5/1998 | Christie et al. | 709/205 |
| 5,781,912 A | 7/1998 | Demers et al. | 707/202 |
| 5,799,187 A * | 8/1998 | McBrearty | 713/2 |
| 5,806,075 A | 9/1998 | Jain et al. | 707/201 |
| 5,813,017 A | 9/1998 | Morris | 707/204 |
| 5,832,263 A * | 11/1998 | Hansen et al. | 711/102 |
| 5,850,565 A | 12/1998 | Wightman | 710/1 |
| 5,878,434 A | 3/1999 | Draper et al. | 707/202 |
| 5,991,771 A | 11/1999 | Falls et al. | 707/202 |
| 5,999,740 A * | 12/1999 | Rowly | 717/11 |
| 6,038,612 A * | 3/2000 | Liow | 710/1 |
| 6,128,652 A * | 10/2000 | Toh et al. | 709/219 |
| 6,243,328 B1 * | 6/2001 | Fenner et al. | 369/30 |

* cited by examiner

SYSTEM AND METHOD FOR GENERATING FILE UPDATES FOR FILES STORED ON READ-ONLY MEDIA

CROSS REFERENCE RELATED APPLICATIONS

This application claims the benefit of U.S. Provisional application Ser. No. 60/091,291; which was filed on Jun. 30, 1998.

FIELD OF THE INVENTION

This invention relates to file updating methods, and more particularly, to file updating methods for files stored on read-only media.

BACKGROUND OF THE INVENTION

Software programs and data are frequently distributed on large capacity storage media such as compact disc-read only memories (CD-ROM). These devices are preferably read-only devices to preserve the integrity of the data and program files stored on the device. Such storage devices contain multiple data and executable program files for an application program and typically include a program to install the program and data files on a user's computer. A common application for distributing a computer program and data files is to provide an interface program and data files for employees that use computers remotely from a central site. For example, a company may equip its sales force with CD-ROMs that contain an interface program that retrieves information from the data files. The retrieved data is used to respond to a customer's questions on product availability or product specifications.

Having timely information available to an organization's remote personnel or being able to provide program patches and other improvements to update software distributed to end users is important for customer service and product support. When the data or programs stored on read-only media are frequently updated or modified, the cost of providing the program or data updates on new storage media such as another CD-ROM can be prohibitively expensive.

Accordingly, what is needed is a way to update information stored on read-only media without having to produce new read-only media containing the program or data updates for distribution to a company's customers or remote personnel.

SUMMARY OF THE INVENTION

The above limitations of previously known program and data storage read-only storage devices are overcome by a system and method made in accordance with the principles of the present invention. The method of the present invention includes the steps of generating a basis index table identifying the data content of an original file system, generating a file of modification data blocks that may be used to modify the data content of the original file system, and generating a delta look up table for identifying the data blocks in the original file system and the data blocks in the file of modification data blocks that provide the data content for a new version of the original file system. The delta look up table and the file of modification data blocks may be stored for delivery to a computer on which a copy of the original file system is stored. The delta look up table and the file of modification data blocks are then used by the computer system on which a copy of the original file system is stored to provide the data content for a new version of the original file system in way that appears to provide a single file system containing the new version of the file system. Thus, the method of the present invention may be used to generate data for updating the content of a copy of the original file system without having to generate a copy of every file and data block for the new content of the original file system.

Preferably, the method generates the basis index table by building a basis directory entry meta-data table and a basis index data block table. The basis directory entry meta-data table organizes the meta-data for each entry in a directory enumeration of the original file system by entry name. Preferably, the entry name identifies the entry and its parent. The meta-data stored for each entry is known meta-data such as file attributes. The basis index data block table uniquely identifies each data block found within the original file system. For each unique data block identifier, a source file identifier that identifies the source file for the data block, the offset to the first data unit for the block within the source file, and the length of the data block are stored. These two tables may then be used to generate the files for generating a new version of the file system.

The method of the present invention also includes the steps of generating a delta directory map file to identify the structure of the entries in the new version of the original file system, a delta look up table (LUT) file for identifying the location of the data blocks to generate the files in the new version of the original file system, and a delta modification data block file that contains the new data content for the new version of the original file system. The delta directory map file contains the name for the entries in the new version of the original file system, the modification status for the entries in the new version of the file system, the meta-data for each entry having a modification status of "modified," "contents modified" or "new," the first look up table record for each file entry, and the number of look up table records used to construct the file in the new version of the original file system. The delta look up table contains at least one LUT record for each file entry having a modification status of "contents modified" or "new." An LUT record identifies the source file containing the data block, the location of the first data unit of the data block in the identified source file, the length of the data block, and the offset of the first data unit of the data block in the file being processed. The source file identifier either identifies a file of the original file system or the modification data block file for the new version. The LUT records for all of the files in the new version of the original file system are stored in an LUT file. The location of the first LUT record for a file is identified by a pointer stored in the meta-data of the delta directory map file for file entries having a modification status of "contents modified" or "new." The directory map file may also be used in the computer having a copy of the original file system to generate information for display or use regarding the structure of the new version of the original file system and its new data content. Structure data includes data that is displayed in response to a directory enumeration command or the like. The delta modification data block file contains the data blocks having new data content for the file entries of the new version of the original file system. As the data blocks for the new data content of the new version of the original file system are stored in the delta modification data block file, a delta index data block table is generated. This table includes a unique identifier for each data block stored in the delta data block modification file that has unique data content, an identifier that indicates the version of the delta data block modification file that is the source file for the block, the offset to the first data unit for the data block and the length of the data block. The delta index data block table is appended to the basis index data block table.

The delta directory map file, the delta modification data block file and the delta look up table may be compressed and stored on storage media or downloaded to a computer having a copy of the original file system. The downloaded delta directory map file, the delta modification data block file and the delta look up table file are used to seamlessly regenerate a new version of the original file system. This regeneration of the new version of the original file system is done in a manner which gives the appearance that the contents of the device on which a copy of the original file system is stored have been modified, even if the device uses read-only media for storage of the original file system. Thus, the system and method of the present invention provide a mechanism for updating the contents of a file system without requiring the production of a complete file system corresponding to the new version of the program and/or data stored in the file system.

Preferably, the method and system of the present invention may be used to generate a representation of a new version of an original file system with reference to the original file system and to the delta modification data block files for previous versions of the original file system. This use of previous versions reduces the amount of data to be stored in the delta directory map file, delta modification data block file, and delta look up table for the latest version of an original file system. In this embodiment of the present invention, the process for generating the files for the new version of the original file system produces delta data block records that identify the source file for a data block as being either a file in the original file system, a delta modification data block file for a previous version of the original file system or the delta modification data block file for the new version of the original file system. The version of the delta modification data block table containing a data block is determined from the delta index data block tables appended to the basis index data block table.

These and other benefits and advantages of the present invention shall become apparent from the detailed description of the invention presented below in conjunction with the figures accompanying the description.

DETAILED DESCRIPTION OF THE INVENTION

Figure 1:
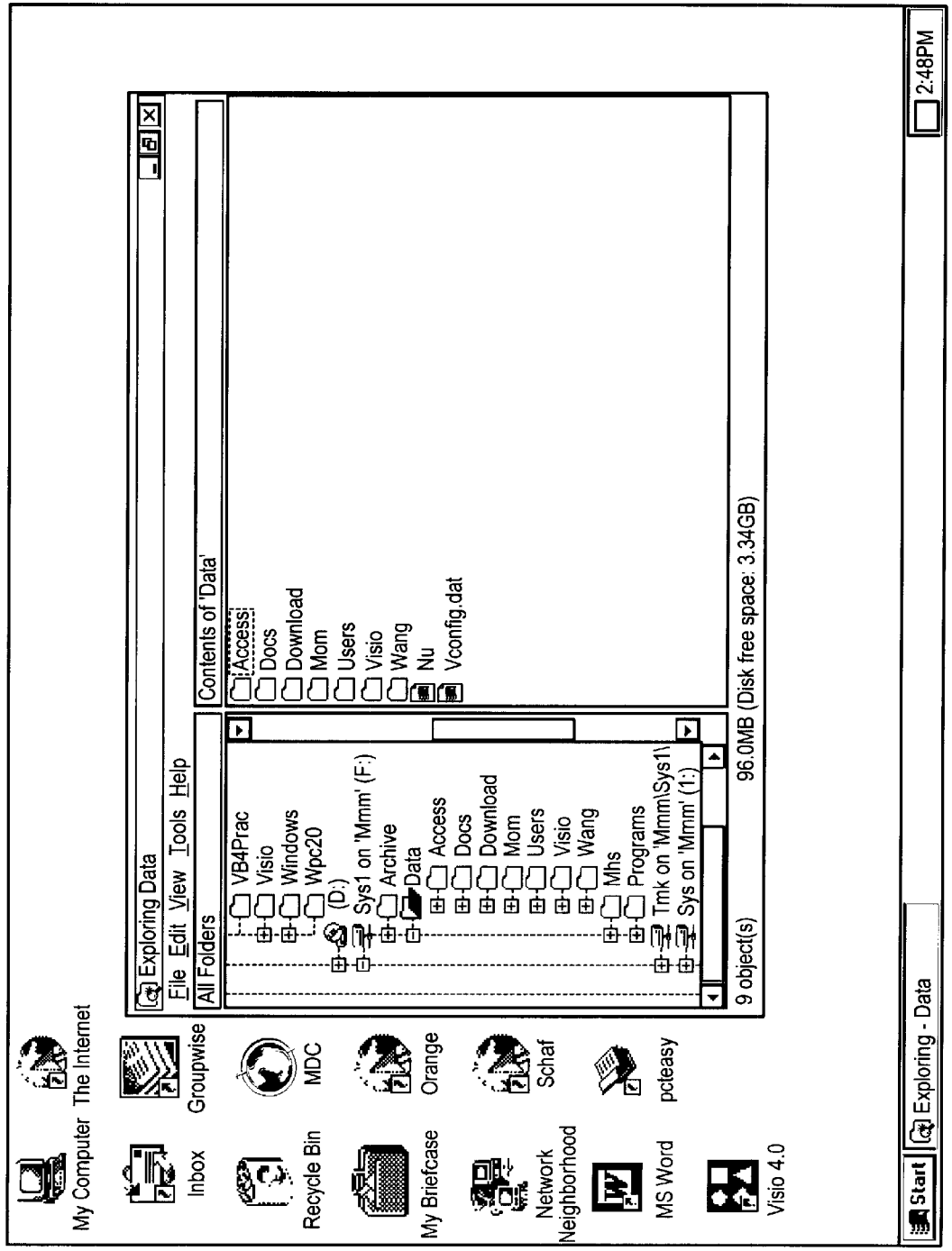
FIG. 1 is a depiction of a screen shot of a file system hierarchy that may be evaluated by the system of the present invention.

FIG. 1 depicts a screen shot of a file system hierarchy. The hierarchy for the file system is comprised of a directory having a list of file entries and subdirectory entries. The subdirectory entries may include additional files for the file system. Each entry in the directory for the file system hierarchy also contains meta-data. For the file entries the meta-data includes known file meta-data such as the file name, file attributes, and other known file meta-data.

Figure 2:
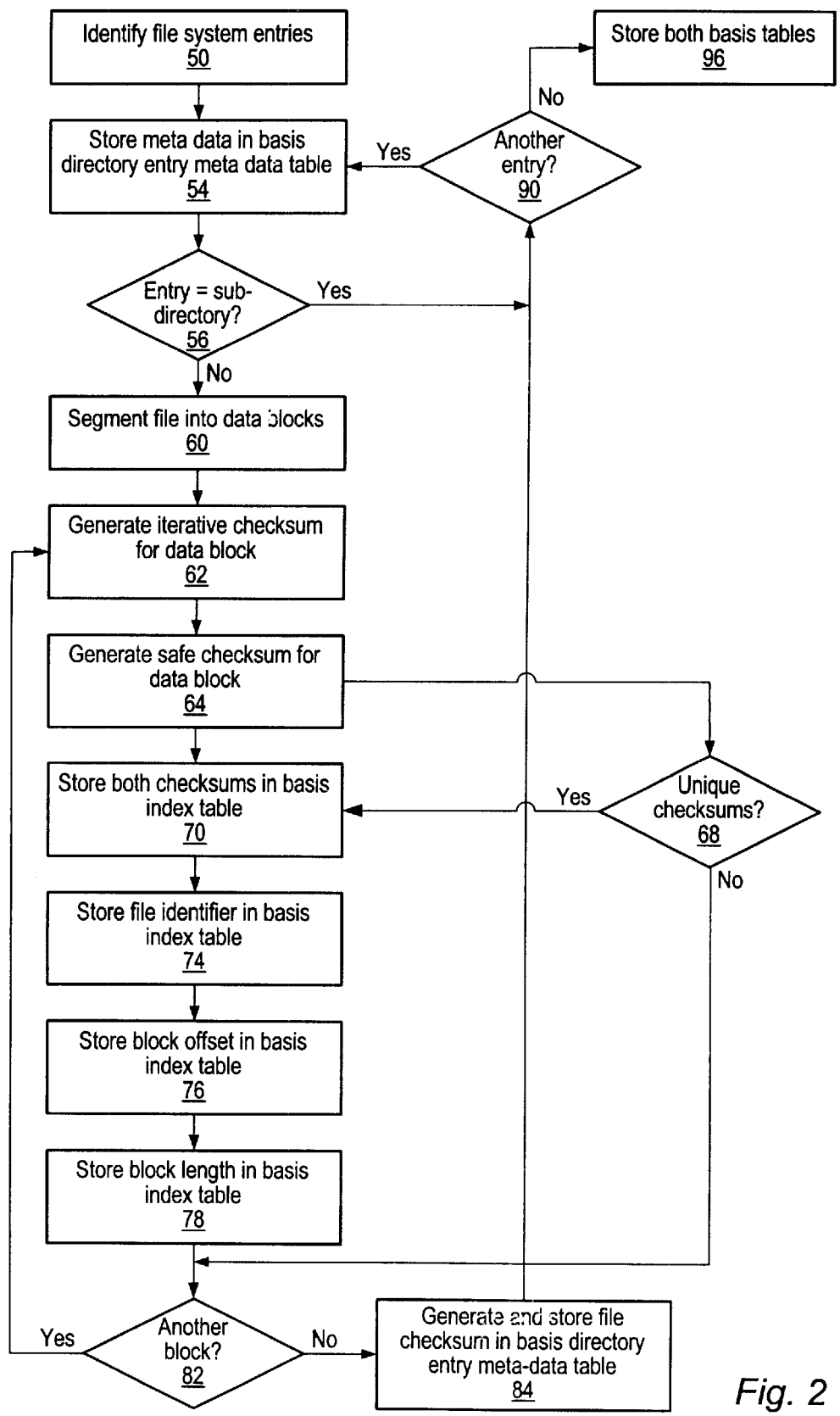
FIG. 2 is a flowchart of an exemplary process that generates a representation of the original file system.

In order to generate modification data files for a file system hierarchy, the original version of the file system hierarchy is processed and information about the system is stored in a file system map file. This process is depicted in FIG. 2. The process begins by processing the directory file for the highest level of the file system hierarchy to identify the entries for the subdirectories and files at the highest level in the file system (Block 50). For each entry, meta-data for the entry is stored in a basis directory meta-data table (Block 54). If the entry is a subdirectory (Block 56), the process determines whether another directory entry exists for processing (Block 90). If there is, it is processed (Block 54). Otherwise, the process terminates as the basis directory entry meta-data table and basis index data block table have been generated.

For a file entry being processed, the file is segmented into blocks of one or more fixed lengths (Block 60). For each block, an iterative checksum (Block 62) and then a safe checksum (Block 64) is generated. The iterative checksum is a value that is computed from the data values for each byte within a block beginning at the first byte of the block to the last byte in the block. It possesses the property that an iterative checksum for a data block comprised of the first N data units in a data string may be used to generate the iterative checksum for the next data block comprised of the N data units beginning at the second data byte. This is done by performing the inverse iterative checksum operation on the iterative checksum using the data content of the first data unit of the first block to remove its contribution to the iterative checksum and then performing the iterative checksum operation on the resulting value using the N+1 data unit that forms the last data unit for the next data block. Thus, two data operations may be used to generate the iterative checksum for the next block in a data string in which the successive data blocks are formed by using a sliding data window in the data string. For example, an addition operation may be used to generate an iterative checksum having the property noted above. A safe checksum is generated by a process that is less likely to produce the same checksum for two blocks having different data contents than the storage media is likely to return an inaccurate data value. A safe checksum generation method well known within the data communication art is the MD5 checksum. The iterative and safe checksum pair for a data block form a checksum identifier that is used to identify the data block. The iterative checksum is not as computationally complex as the safe checksum so the iterative checksum is a relatively computational resource efficient method for a determining that two data blocks may be the same. The safe checksum may then be used to verify that the data content of the blocks are the same and reduce the likelihood of a false positive identification. If the checksum identifier is the same as the checksum identifier for a data block previously stored in the index data block table (Block 68) then the data content of the data block is not unique. Thus, the data block record in the index data block table for the corresponding checksum identifier adequately defines the data block being processed so the checksum identifier is not stored in the index data block table and the process determines whether another data block is to be processed (Block 82).

If the checksum identifier indicates the data block content is unique, the iterative checksum is stored as the primary key in the index data block table and the safe checksum is stored in the index data block table as a qualified key (Block 70). Associated with the checksum identifier for the block is an identifier for the file from which the data block came (Block 74), the offset from the first byte within the file to the first byte in the data block (Block 76), and the length of the data block (Block 78). The source file identifier may be the name of the file in which the data block is stored, but preferably, it is a pointer to the meta-data in the basis directory entry meta-data table for the source file. This process of identifying and storing information about each data block in the index data block table continues (Block 82) until all of the blocks for a file entry have been processed. A safe checksum for the entire data content of the file is then generated and stored in the basis directory entry meta-data table (Block 84). The process continues (Block 90) until all entries for the entire directory structure for the original file system have been processed. The basis directory entry meta-data table and basis index data block table file system map file representing the meta-data and data content for each entry within the file system hierarchy is then stored on storage media (Block 96). This data forms the baseline for generating modification data files for updating the original file system.

Figure 3A:
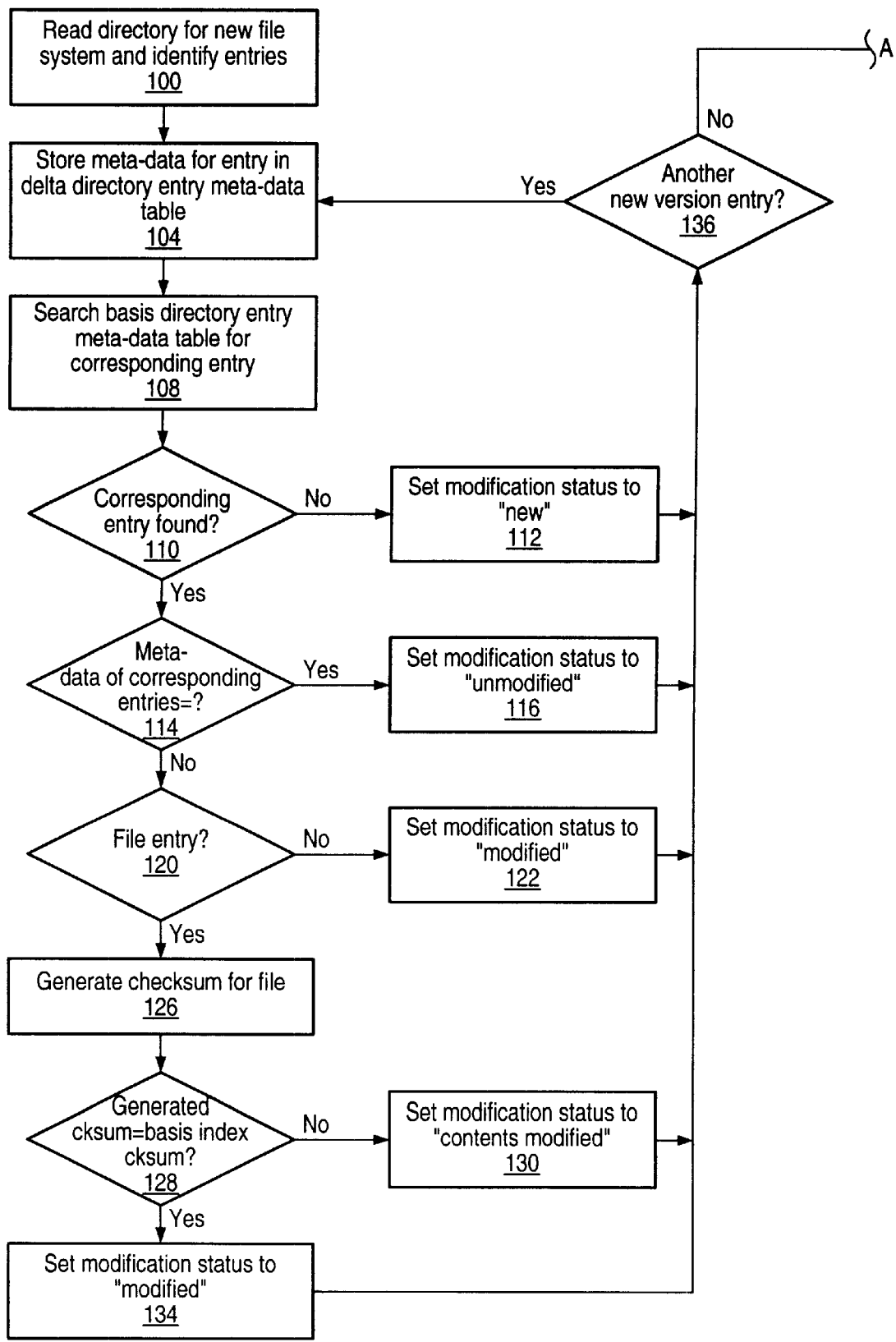
FIGS. 3A and 3B are a flowchart of an exemplary process that generates the look-up table file and modification data block file for an update to the representation of the original file system generated by the process shown in FIG. 2.
Figure 3A:
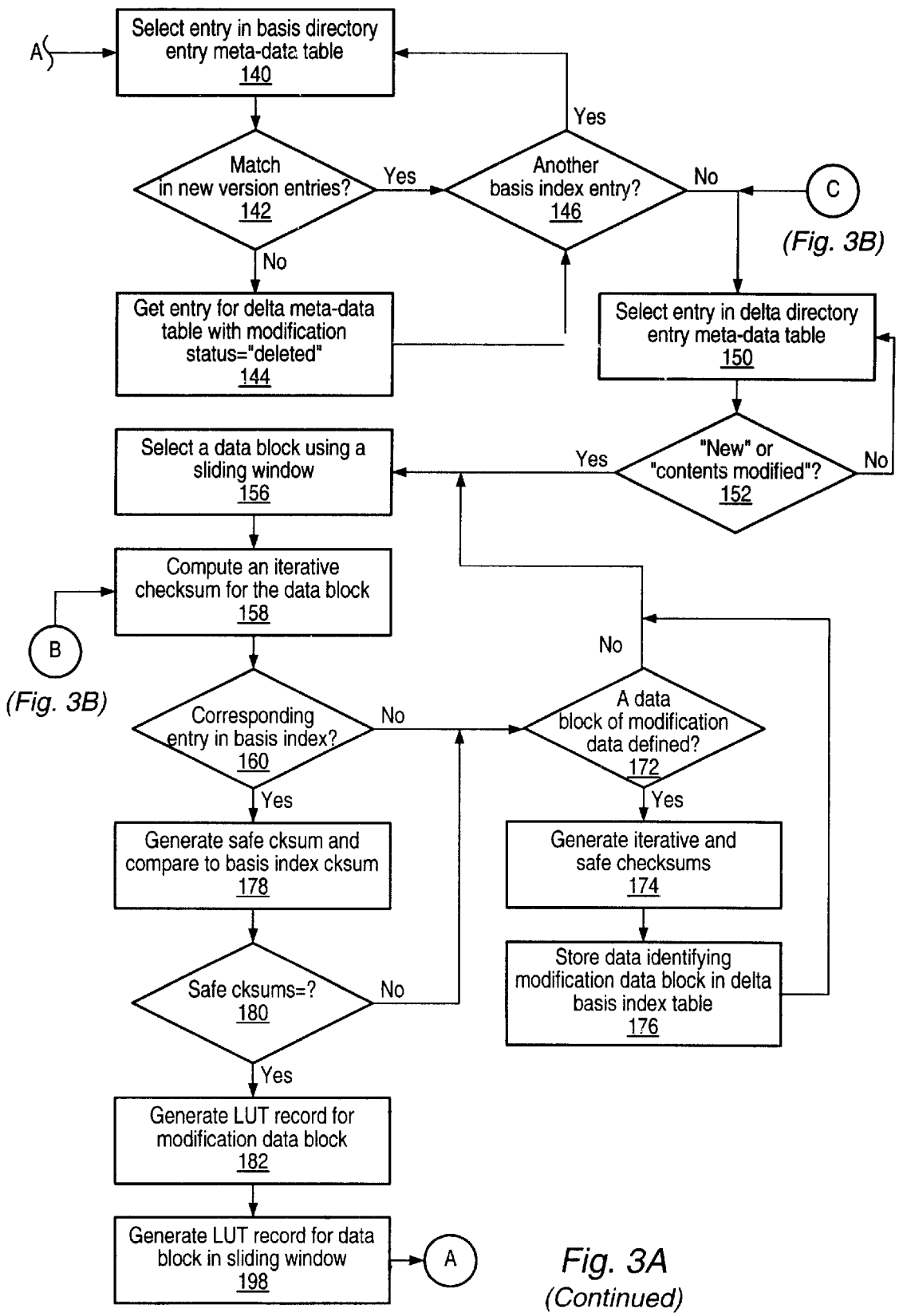
Figure 3B:
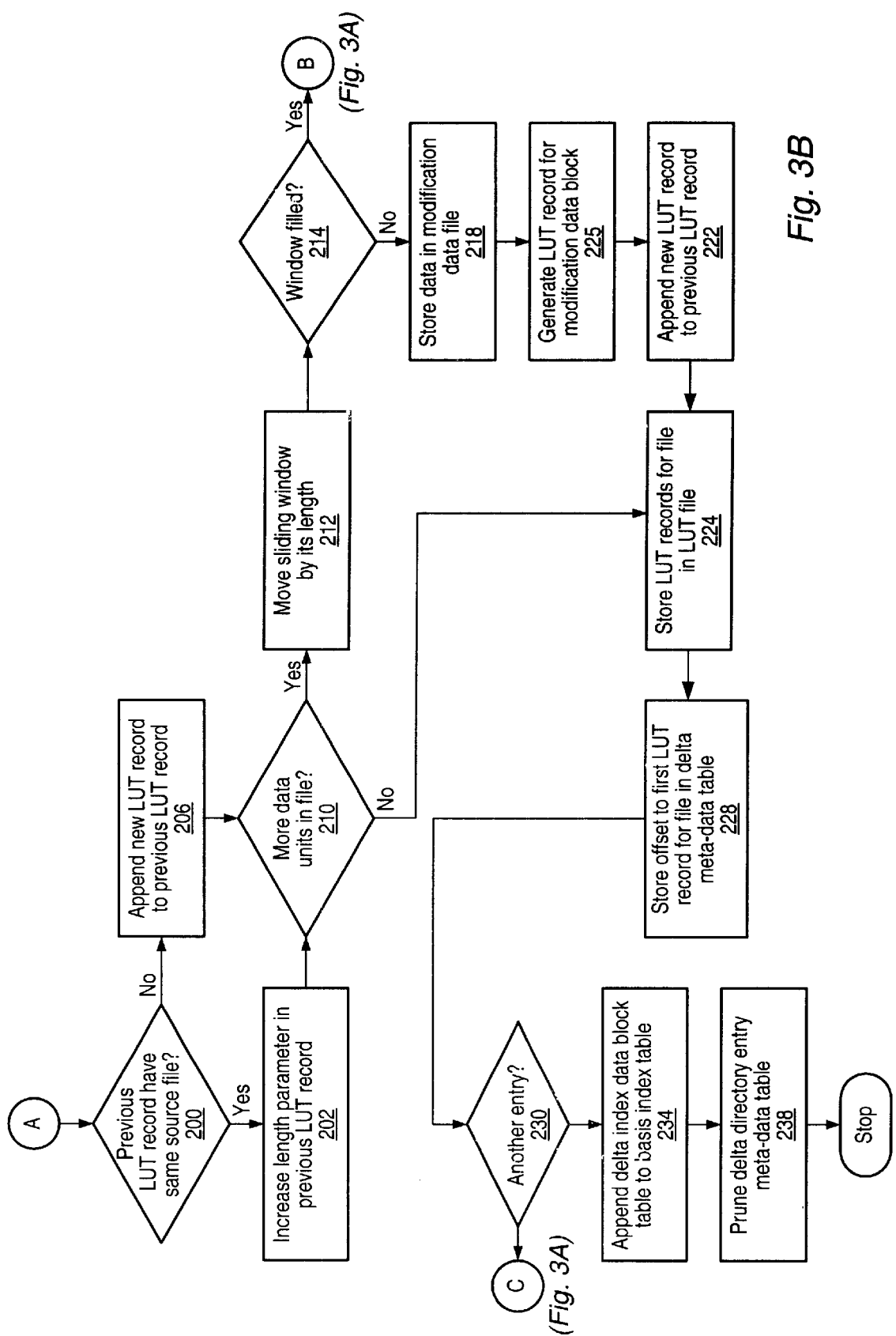

Whenever a new version of a file system hierarchy is generated, either by changing, deleting or adding data to a file or its meta-data or by adding or deleting data files to the file system, a delta modification data block file and delta look up table may be generated to provide the update information for the differences between the original file system hierarchy and the new version of the file system hierarchy. The process for generating the delta modification data block file and the delta look up table is shown in FIG. 3. That process begins by reading the directory file for the new file system hierarchy and identifying the entries for the subdirectories and files in the file system hierarchy (Block 100). Each entry is then processed by storing the meta-data for the entry in a delta directory entry meta-data table (Block 104). The status of the entry is then determined by searching the basis directory entry meta-data table for an entry having the same name under the same parent (Block 108). If no corresponding entry is located in the basis directory entry meta-data table (Block 110), then the modification status for the entry in the new file system hierarchy is set to "new" (Block 112). If a corresponding entry is located in the basis directory entry meta-data table then the meta-data for the corresponding entry is compared to the meta-data for the entry in the delta directory entry meta-data table (Block 114) and, if the meta-data is the same for both entries, the modification status is set to "unmodified" (Block 116). If the meta-data for the entries do not correspond and the entries are not files (Block 120), the modification status is set to "modified" (Block 122). If the meta-data for the entries do not correspond and the entries are files, a safe checksum is generated for the data contents of the file entry in the new file system (Block 126). This safe checksum is compared to the safe checksum for the entire data content of the file stored in the basis directory entry meta-data table (Block 128) and if they are not equal, the modification status is set to "contents modified" (Block 130). Otherwise, the modification status is set to "modified" (Block 134). The modification status is stored in the delta directory entry meta-data table. This process continues until all of the entries in the new version of the original file system have been processed (Block 136).

The basis directory entry meta-data table is now searched to determine whether a corresponding entry exists in the delta directory entry meta-data table. Specifically, a directory entry in the basis directory entry meta-data table is selected (Block 140) and the delta directory entry meta-data table is searched for a corresponding entry (Block 142). If no corresponding entry is located, an identifier for the entry and a modification status of "deleted" is generated and stored in the delta directory entry meta-data table (Block 144). The process continues until all entries in the basis index directory entry meta-data table have been checked (Block 146).

The process now selects an entry in the delta directory entry meta-data table (Block 150) and determines whether it has a modification status of "new" or "contents modified" (Block 152). For these entries, look up table (LUT) records are generated and data blocks stored in the delta modification data block file, if necessary. If an entry is identified as being a "new" or "contents modified" entry, a sliding window of N data units, such as 256 bytes, is used to define data blocks (Block 156). As noted before, the number N must be one of the block sizes used to segment files in the original file system for constructing the basis index data block table. An iterative checksum is computed for the first data block formed by the sliding window being placed at the first data unit of the data contents of the "new" or "contents modified" file (Block 158). This iterative checksum is compared to the iterative checksums of the checksum identifiers stored in the basis index data block table to determine whether a corresponding entry may exist (Block 160). If no corresponding iterative checksum is found, the checksum identifier for the data block being processed cannot be the same as one in the index basis data block table so the first data unit of the data block in the sliding window is stored in a delta modification data block file (Block 162). The sliding window is then moved to remove the first data unit from the data block in the file being processed and to add the next data unit (Block 156). The iterative checksum for the data block in the sliding window is computed (Block 158) and compared to the iterative checksums of the checksum identifiers in the basis index data block table(Block 160). Because the iterative checksum has the property discussed above, the iterative checksum for each successive data block only requires calculations to remove the contribution of the data units removed from the block by moving the sliding window and to add the contributions of the data units added by moving the sliding window. Moving the sliding window, generating the next iterative checksum and comparing the generated iterative checksum to those for the checksum identifiers in the basis index data block table continues until a corresponding iterative checksum for one of the checksum identifiers is located or the number of data units stored to the delta modification data block file corresponds to the number of data units for a data block (Block 172). When a data block of modification data has been stored to the delta modification data block file, the iterative and safe checksums for the block are generated to form a checksum identifier for the block (Block 174). The iterative checksum and safe checksum for the block of modification data are then stored as the primary key and qualified key, respectively, in a delta index data block table associated with the new version of the original file system. An identifier of the delta modification data block file in which the data block is stored, the offset into that file that defines the location of the first data unit for the data block being processed, and the length of the data block being processed are also stored in the delta index data block table in association with the iterative and safe checksums (Block 176).

Once an iterative checksum for a data block within the sliding window corresponds to one or more iterative checksums in the checksum identifiers stored in the basis index data block table, the process computes the safe checksum for the block within the sliding window and compares it to the safe checksums of the checksum identifiers selected from the basis index data block table (Block 178). Only one, if any, safe checksum of the checksum identifiers should be the same as the safe checksum computed for the data block. If a corresponding safe checksum is identified, the data blocks are the same. The process determines whether the previous data block checksum identifier comparison indicated a corresponding checksum identifier in the basis index data block table was located (Block 180). If the previous checksum identifier comparison did not find a corresponding checksum identifier, a look up table (LUT) record is generated for the data units stored in the delta modification data block file since the last corresponding checksum identifier was detected (Block 182). That is, all of the data following the identification of the last data block that is also in the basis index data block table is stored in the delta data modification file and the LUT record for that data indicates that the data is a contiguous block of data. The LUT record is comprised of a delta modification data block file identifier, the offset from the first data unit in the modification data file to the contiguous data block stored in the modification data file, the number of data units in the contiguous data block stored in the modification data file, and the offset of the data block in the file currently being processed. The first three data elements in the LUT to identify the source file for the data block in the new version of the original file system and its location in that file while the fourth data element defines the location of the data block in the file of the new version of the original file system. As discussed below, this permits the application program that controls access to the new version of the original file system to not only know from where it can retrieve the data block but where it goes in the new version of the file.

At this point in the process, the checksum identifier for the data block within the sliding window has been identified as being the same as a checksum identifier in the basis index data block table. As this block already exists in a file in the original version of the file system, a different LUT record is generated for the data block within the sliding window (Block 198). The LUT record for the data block that corresponds to the checksum identifier stored in the basis index data block table is comprised of the same source file identifier as the one in the basis index data block table, the same offset from the start of the source file, the same data block length stored in the basis index data block table, and the offset of the data block in the file currently being processed. The process then continues by determining whether the previous LUT record for the file being processed has a source file identifier that is the same as the one for the LUT record generated for the data block within the sliding window (Block 200). If it does and the LUT just generated is for a data block that is contiguous with the data block identified by the previous LUT record, the process increases the length stored in the previous LUT record by the length of the data block in the LUT record generated for the data block just processed and discards the new LUT record (Block 202). This corresponds to the situation where contiguous blocks of the data in a file of the new version of the original file system are the same as a group of contiguous blocks in a file of the original file system. Thus, one LUT record can identify a source for the contiguous group of blocks. If the data block for the new LUT record is not contiguous with the data block of the previous LUT record or is not from the same source file, then the LUT record is appended to the previous LUT record (Block 206). If the safe checksum does not correspond to the safe checksum for a data block having the corresponding iterative checksum, the process determines whether a data block of modification data has been defined (Block 172). The process continues until it determines whether all data units in the file have been processed (Block 210). If more data units exist, the sliding window is moved by its length to capture a new data block (Block 212). If the number of remaining data units do not fill the sliding window (Block 214), the remaining data units are stored in the delta modification data block file (Block 218) and a corresponding LUT record is generated (Block 220). The LUT records generated for the file being processed are then appended to the LUT records for other files previously stored in an LUT file for the new version of the original file system (Block 222) and the LUT records for the file are stored in the LUT file (Block 224). The offset for the first LUT for the file being processed and the number of LUT records for this file are then stored in the meta-data of the delta directory entry meta-data table for the file being processed (Block 228). The process then checks for more entries in the delta directory entry meta-data table to process (Block 230). If there are more entries the process continues (Block 150). If all of the delta directory entries have been processed, the delta directory entry meta-data table for the entries in the new version of the original file system is then searched for any entries having a modification status of "unmodified." These entries and their meta-data are removed unless they have a descendant having a modification status other than "unmodified" (Block 238).

In an embodiment of the present invention that utilizes previous updates provided for the original file system, the above process is modified to evaluate the delta index data block tables for previous versions of the original file system. Specifically, the process searches the basis index data block tables and the delta index data block tables files for update versions to locate data blocks having corresponding iterative and safe checksums for corresponding "new" or "contents modified" files in the latest version. Additionally, the source of data blocks may also include delta modification data files for previous update versions of the original file system as well as the files of the original file system and the delta modification data block file for the latest version.

Figure 4:
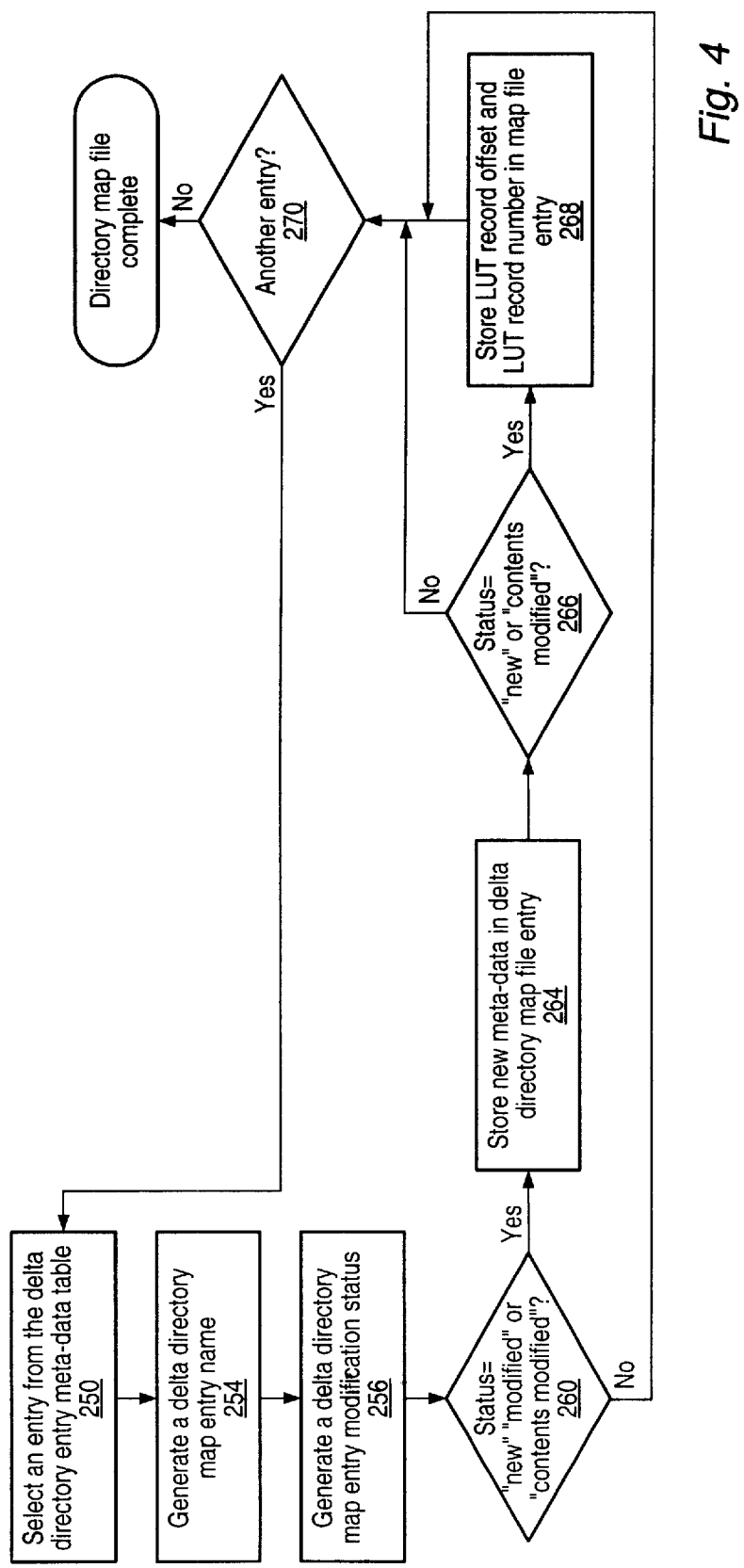
FIG. 4 is a flowchart of an exemplary process that generates a delta directory map file for the new version of the original file system from the delta directory entry meta-data table generated by the process shown in FIGS. 3A and 3B.

The delta directory entry meta-data table for the new version of the original file system generated by the process in FIG. 3 is then used by the process shown in FIG. 4 to generate a delta directory map file. An entry is selected from the delta directory entry meta-data table (Block 250) and an entry in the delta directory map file system is generated. The entry at least includes the name of the entry (Block 254) and its modification status (Block 256). If the modification status is "new", "modified" or "contents modified" (Block 260), the new meta-data is also stored in the delta directory map file for the entry (Block 264). If the modification status is "new" or "contents modified," (Block 266), the offset to the first LUT record for the file in the LUT file and the number of LUT records for the file in the LUT file are stored in the delta directory map file (Block 268). The process continues until all entries in the delta directory entry meta-data table have been processed (Block 270). The name of the new file system hierarchy, its version identifier, directory map file, LUT file, and modification data files may now be compressed for delivery to a system having a copy of the original file system.

Figure 5:
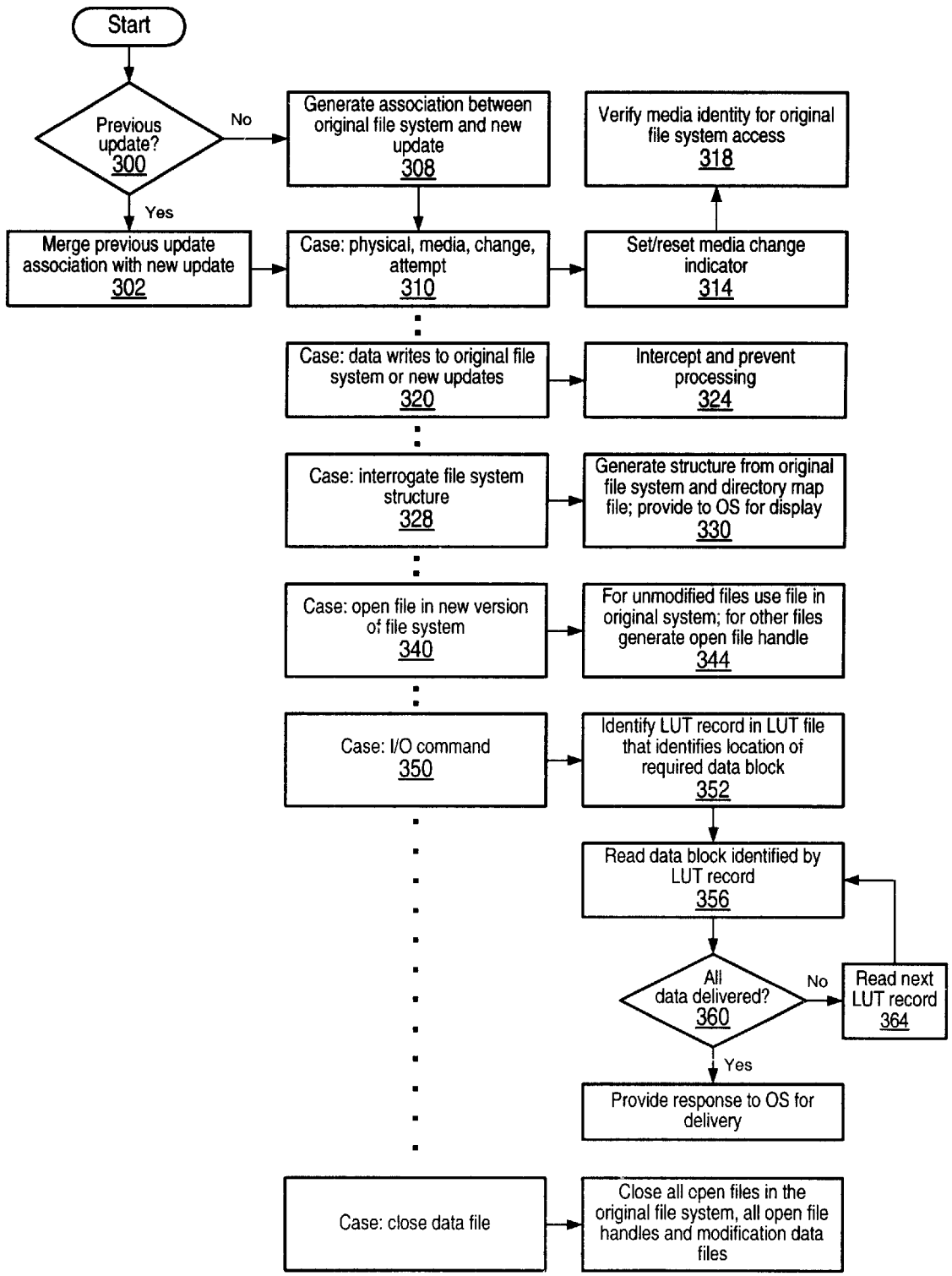
FIG. 5 is a flowchart of an exemplary process that uses the files for an update generated by the process shown in FIGS. 3A, 3B and 4 to generate a latest version of the original file system.

Once the compressed representation of the new version of the original file system is transferred to a computer on which a copy of the original file system hierarchy is stored, it may be used to update the original file system. An application program may be provided as part of that representation to perform the process depicted in FIG. 5. Alternatively, the application program may be part of the interface program provided for accessing the content of the original file system hierarchy such as an extension to the file system program of the recipient computer. The program decompresses the representation of the new file system hierarchy and stores the delta directory map file, LUT file, and delta modification data block file in storage accessible to the computer. The process then determines whether a reference to the directory containing a delta modification data block file for a previous version of the original file system hierarchy is associated with a reference to the directory or drive containing the original file system hierarchy (Block 300). If there is an association between a directory or drive containing the original file system hierarchy and a directory containing a delta modification data block file, that association is merged with a reference to the directory or drive where the decompressed files for the new file system hierarchy are stored (Block 302). The merge replaces the existing associated delta directory map file and LUT file with the new delta directory map file and LUT file, but leaves any existing delta modification data block files referenced in the new LUT file. Otherwise, an association is generated between the drive or directory where the original file system hierarchy is stored and the directory where the downloaded decompressed files for the new version of the original file system hierarchy is stored (Block 308). The application program may be coupled to the operating system of the computer in which a copy of the original file system hierarchy and the decompressed files for the new version of the file system hierarchy are stored. In a known manner, the operating system is modified to detect any attempted access to the drive or directory containing the original file system hierarchy or the files for the new version of the file system hierarchy. In response to an attempted operation to change the physical media for the original file system hierarchy (Block 310), the application program stores a media change indicator (Block 314) and verifies the identity of the physical media when a subsequent attempt is made to access the original file system hierarchy (Block 318). If the physical media has changed, the application change program checks the media change indicator and determines whether the original file system media is available. If it is not, the program indicates that the original file system hierarchy is not available for access by the user. Otherwise, the access is processed. Attempts to write data to the drive or directory containing the original file system hierarchy or the files for the new version of the original file system detected by the application program (Block 320) are not processed (Block 324).

For commands attempting to interrogate the structure of the original file system hierarchy, the application program responds by building data in two passes and presenting that data to the user. A command to interrogate the structure of the original file system hierarchy is one such as a directory enumeration command. In response to a structure inquiry (Block 328), the application program first retrieves the requested structure data from the original file system and deletes the entries for which the modification status in the delta directory map file is "deleted," "modified", "new" or "contents modified." The data for these entries is obtained from the delta directory map file and used to modify the structure data responsive to the structure query (Block 330). That is, the application program obtains the data to be displayed for the original file system hierarchy, deletes those files corresponding to delta directory map file entries having a modification status of "deleted", adding structure data for those entries in the directory map file having a status of "new", and modifying the structure data for those entries in the directory map file having a status of "modified" or "contents modified." This data is then provided to the operating system for display to the user.

For file system operations that open a file in the new version of the original file system hierarchy (Block 340), the application program determines whether the modification status of the file is "unmodified." If it is, the operation is processed using the contents of the original file system only. Otherwise, the application program constructs and returns an open file handle that identifies the file (Block 344). The open file handle identifies the file for subsequent file operation commands but does not open any underlying file. For any file system operation command that interrogates the properties of a file for which an open file handle exists, the application program returns data from the delta directory map file entries that correspond to the file identified by the open file handle.

In response to an I/O operation command that reads data from a file identified by an open file handle (Block 350), the application program constructs a response to the query by identifying the LUT record in the LUT file that corresponds to the start of the requested data (Block 352). If the underlying file referenced in the LUT record is not opened, the application program opens the underlying file and associates it with the open file handle. The program then reads from the LUT record whether the data for the requested data block is to be read from the original file system hierarchy or one of the delta modification data block files. After the source file is identified, the offset data and data block length are used to locate the first byte to be transferred from the identified source file and the number of bytes to be transferred, respectively. The corresponding number of bytes are transferred from the source file to a response being built (Block 356). If additional data is required for the response (Block 360), the next LUT record is used to extract data for the response (Block 364). This process continues until the data transferred for an LUT record provides all of the data requested or until the last entry for the file is reached. The response built from the transfer of data from the source files identified by the LUT records is then provided to the operating system for delivery to the requesting program (Block 368). In this manner, a response is provided to a file system operation that appears to be the result of a single contiguous read operation. In response to a file system operation that closes a data file (Block 370), the application program closes all corresponding files in the original file system hierarchy and the data files for the new file system hierarchy (Block 372).

The method and system presented above are only exemplary of the many ways in which the invention may be embodied. Other embodiments of the invention will be apparent to those skilled in the art from a consideration of the specification or from practice of the invention disclosed herein. It is intended that the scope and spirit of the present invention be indicated by the following claims.

What is claimed is:

1. A method for representing modifications to a set of data objects comprising:

generating a baseline of a first version of a set of data objects;

identifying the differences between a second version of the set of data objects and the first version of the set of data objects by:

comparing meta-data for data objects in the second version of the set of data objects to meta-data for data objects in said baseline to determine whether a data object in said second version of said set of data objects is a new data object or a modified data object;

comparing meta-data for data objects in said baseline to meta-data for data objects in said second version of said data objects to determine whether one of said data objects in said first version of said data objects is absent in said second set of said data objects;

wherein said meta-data for data objects in the first version of the set of data objects are stored in a basis directory entry meta-data table, and wherein said meta-data for data objects in the second version of the set of data objects are stored in a delta directory entry meta-data table;

generating update information corresponding to the identified differences, said update information including references to segmented portions of said baseline that correspond to said identified differences regardless of location of said segmented portions in said baseline; and storing the update information whereby the update information may be retrieved and used to generate the second version of the set of data objects from the first version of the set of data objects.

2. A method for representing modifications to a set of data objects comprising:

generating a baseline of a first version of a set of data objects;

identifying the differences between a second version of the set of data objects and the first version of the set of data objects by:

comparing meta-data for data objects in the second version of the set of data objects to meta-data for data objects in said baseline to determine whether a data object in said second version of said set of data objects is a new data object or a modified data object; and comparing meta-data for data objects in said baseline to meta-data for data objects in said second version of said data objects to determine whether one of said data objects in said first version of said data objects is absent in said second set of said data objects;

wherein said meta-data for data objects in the first version of the set of data objects are stored in a basis directory entry meta-data table, and wherein said meta-data for data objects in the second version of the set of data objects are stored in a delta directory entry meta-data table;

generating a delta look-up table;

generating a delta directory map file from said delta directory entry meta-data table and said delta look-up table;

storing the update information whereby the update information may be retrieved and used to generate the second version of the set of data objects from the first version of the set of data objects.

3. A method for representing modifications to a set of data objects comprising:

generating a baseline of a first version of a set of data objects;

identifying the differences between a second version of the set of data objects and the first version of the set of data objects;

generating update information corresponding to the identified differences, said update information including references to segmented portions of said baseline that correspond to said identified differences regardless of location of said segmented portions in said baseline;

generating an iterative checksum from a segmented portion of said second version of the set of data objects;

generating a safe checksum from said segmented portion of said second version of the set of data objects;

forming an identifier from said iterative checksum and said safe checksum; and storing each said identifier for each said segmented portion in said second version.

4. A method for representing modifications to a set of data objects comprising:

generating a baseline of a first version of a set of data objects;

identifying the differences between a second version of the set of data objects and the first version of the set of data objects by:

segmenting data objects in said second version;

comparing an iterative checksum for a segmented portion in said second version of said set of data objects to an iterative checksum for a segmented portion in said baseline;

comparing a safe checksum for said segmented portion in said second version of said set of data objects to a safe checksum for said segmented portion in said baseline in response to said iterative checksum comparison indicating said iterative checksums correspond;

generating update information corresponding to the identified differences, said update information comprising a data block and a corresponding identifier for each said segmented portion in said second version for which no corresponding segmented portion was identified in said baseline;

storing the update information whereby the update information may be retrieved and used to generate the second version of the set of data objects from the first version of the set of data objects.

5. A method for representing modifications to a set of data objects, comprising:

generating at least one basis table, wherein at least one basis table identifies content of a first version of a set of data objects;

identifying differences between the first version of the set of data objects and a second version of the set of data objects by:

comparing an iterative checksum for at least one data block of the second version of the set of data objects to an iterative checksum in a basis table;

comparing a safe checksum for at least one data block of the second version of the set of data objects to a safe checksum in a basis table in response to the iterative checksum comparison indicating that the iterative checksums correspond;

generating update information corresponding to the identified differences; and storing at least a portion of the update information such that at least a portion of the update information can be retrieved and used with the first version of the set of data objects to generate the second version of the set of data objects.

6. The method of claim 5, wherein the update information comprises at least one reference to a data object of the first version of the set of data objects.

7. The method of claim 5, wherein generating at least one basis table comprises:
- selecting a data object of the first version of the set of data objects;
- determining whether the content of at least one data block is unique with respect to other data blocks previously selected from the first version of the set of data objects.

8. The method of claim 7, wherein generating at least one basis table further comprises generating and storing identifying data corresponding to the identity of the selected data object.

9. The method of claim 7, wherein generating at least one basis table further comprises segmenting the selected data object into data blocks to form segmented portions.

10. The method of claim 9, wherein segmenting the selected data object comprises forming data blocks of a fixed length.

11. The method of claim 5, wherein generating at least one basis table comprises:
- selecting a data object of the first version of the set of data objects;
- determining whether the content of at least one data block is unique with respect to other data blocks previously selected from the first version of the set of data objects;
- if a data block is unique, storing data identifying the content of the data block and the location of the data block within the selected data object to form at least one entry in at least one basis table; and
- continuing the selection, determination and storing of data for data blocks within the data objects of the first version of the set of data objects to generate at least one basis table.

12. The method of claim 11, wherein the selection, determination and storing of data for data blocks within the data objects of the first version of the set of data objects continues until all of the data objects within the first version of the set of data objects have been selected.

13. The method of claim 5, wherein generating at least one basis table comprises:
- selecting a data object of the first version of the set of data objects;
- generating and storing identifying data corresponding to the identity of the selected data object;
- segmenting the selected data object into data blocks to from segmented portions;
- determining whether the content of at least one data block is unique with respect to other data blocks previously selected from the first version of the set of data objects;
- if a data block is unique, storing data identifying the content of the data block and the location of the data block within the selected data object to form at least one entry in at least one basis table; and
- continuing the selection, generation, segmentation, determination and storing of data for data blocks within the data objects of the first version of the set of data objects to generate at least one basis table.

14. The method of claim 5, wherein at least one basis table comprises a basis index data block table file system map, and wherein the basis index data block table file system map comprises data identifying content and location of at least one unique data block of the first version of the set of data objects.

15. The method of claim 5, wherein at least one basis table comprises a basis directory entry meta-data table, and wherein the basis directory entry meta-data table comprises identifying data corresponding to at least one data object in the first version of the set of data objects.

16. The method of claim 5, wherein at least one basis table comprises a basis index data block table file system map, and wherein the basis index data block table file system map comprises data identifying content and location of each unique data block of the first version of the set of data objects.

17. The method of claim 5, wherein at least one basis table comprises at least one basis directory entry meta-data table, and wherein at least one basis directory entry meta-data table comprises identifying data corresponding to each data object in the first version of the set of data objects.

18. The method of claim 5, wherein generating update information comprises generating a delta modification data block file comprising at least a portion of at least one data object of the second version of the set of data objects, and wherein the portion of at least one data object of the second version of the set of data objects corresponds to data not present in the first version of the set of data objects.

19. The method of claim 5, wherein generating update information comprises generating a delta look-up table comprising at least one reference to a location of at least one data block needed to generate the second version of the set of data objects.

20. The method of claim 5, wherein at least one basis table comprises a basis directory entry meta-data table comprising meta-data for data objects in the first version of the set of data objects.

21. The method of claim 5, further comprising generating a delta directory entry meta-data table wherein the delta directory entry meta-data table comprises meta-data for data objects in the second version of the set of data objects.

22. The method of claim 5, further comprising generating a delta directory map file comprising a modification status for at least one data object in the second version of the set of data objects after identifying the differences between the first and second versions of the set of data objects.

23. The method of claim 5, further comprising generating at least one delta directory map file after identifying differences between the first and second versions of the set of data objects, wherein at least one delta directory map file comprises a modification status for at least one data object.

24. The method of claim 5, further comprising generating at least one delta directory map file after identifying differences between the first and second versions of the set of data objects, wherein at least one delta directory map file comprises meta-data for at least one data object.

25. The method of claim 5, further comprising generating at least one delta directory map file after identifying differences between the first and second versions of the set of data objects, wherein at least one delta directory map file comprises a location of a first look up table record for at least one data object, and wherein at least one delta directory map file comprises a number of look up table records needed to construct at least one data object in the second version of the set of data objects.

26. The method of claim 5, further comprising storing content of at least one data block of the second version of the set of data objects in at least one delta table, wherein at least one data block of the second version for which the content is stored has no corresponding data block identified in a basis table.

27. The method of claim 5, wherein identifying differences between the first version of the set of data objects and the second version of the set of data objects further comprises identifying at least one contiguous set of data blocks in the second version of the set of data objects that corresponds to at least one contiguous set of data blocks in at least one basis table.

28. The method of claim 5, further comprising:
identifying differences between a new version of the set of data objects and a combination of at least one basis table and update information for at least one intervening version of the set of data objects;
generating new update information corresponding to the identified differences; and
storing the new update information such that the new update information can be retrieved and used with the first version of the set of data objects to generate the new version of the set of data objects.

29. The method of claim 28, wherein the new update information is stored such that at least one segmented portion of the new version of the set of data objects that is present in the first version of the set of data objects or in at least one intervening version of the set of data objects is not stored in the new update information.

30. A representation of modifications to a set of data objects created by the method of claim 5.

31. A method for representing modifications to a set of data objects, comprising:
generating at least one basis table, wherein at least one basis table identifies content of a first version of a set of data objects;
identifying differences between the first version of the set of data objects and a second version of the set of data objects by identifying whether at least one data block of the second version of the set of data objects corresponds to at least one data block of a basis table;
forming an identifier of at least one data block of the second version of the set of data objects, wherein at least one data block of the second version for which the identifier is formed has no corresponding data block identified in a basis table, wherein forming the identifier comprises:
generating an iterative checksum from a data block;
generating a safe checksum from the data block; and
forming the identifier from the iterative checksum and the safe checksum;
storing the formed identifier in at least one delta table;
generating update information corresponding to the identified differences; and
storing at least a portion of the update information such that at least a portion of the update information can be retrieved and used with the first version of the set of data objects to generate the second version of the set of data objects.

32. The method of claim 31, wherein the update information comprises at least one reference to a data object of the first version of the set of data objects.

33. The method of claim 31, wherein generating at least one basis table comprises:
selecting a data object of the first version of the set of data objects;
determining whether the content of at least one data block is unique with respect to other data blocks previously selected from the first version of the set of data objects.

34. The method of claim 33, wherein generating at least one basis table further comprises generating and storing identifying data corresponding to the identity of the selected data object.

35. The method of claim 33, wherein generating at least one basis table further comprises segmenting the selected data object into data blocks to form segmented portions.

36. The method of claim 35, wherein segmenting the selected data object comprises forming data blocks of a fixed length.

37. The method of claim 33, wherein generating at least one basis table comprises:
selecting a data object of the first version of the set of data objects;
determining whether the content of at least one data block is unique with respect to other data blocks previously selected from the first version of the set of data objects;
if a data block is unique, storing data identifying the content of the data block and the location of the data block within the selected data object to form at least one entry in at least one basis table; and
continuing the selection, determination and storing of data for data blocks within the data objects of the first version of the set of data objects to generate at least one basis table.

38. The method of claim 37, wherein the selection, determination and storing of data for data blocks within the data objects of the first version of the set of data objects continues until all of the data objects within the first version of the set of data objects have been selected.

39. The method of claim 31, wherein generating at least one basis table comprises:
selecting a data object of the first version of the set of data objects;
generating and storing identifying data corresponding to the identity of the selected data object;
segmenting the selected data object into data blocks to from segmented portions;
determining whether the content of at least one data block is unique with respect to other data blocks previously selected from the first version of the set of data objects;
if a data block is unique, storing data identifying the content of the data block and the location of the data block within the selected data object to form at least one entry in at least one basis table; and
continuing the selection, generation, segmentation, determination and storing of data for data blocks within the data objects of the first version of the set of data objects to generate at least one basis table.

40. The method of claim 31, wherein generating update information comprises generating a delta modification data block file comprising at least a portion of at least one data object of the second version of the set of data objects, and wherein the portion of at least one data object of the second version of the set of data objects corresponds to data not present in the first version of the set of data objects.

41. The method of claim 31, further comprising:
identifying differences between a new version of the set of data objects and a combination of at least one basis table and update information for at least one intervening version of the set of data objects;
generating new update information corresponding to the identified differences; and
storing the new update information such that the new update information can be retrieved and used with the first version of the set of data objects to generate the new version of the set of data objects.

42. The method of claim 41, wherein the new update information is stored such that at least one segmented portion of the new version of the set of data objects that is present in the first version of the set of data objects or in at least one intervening version of the set of data objects is not stored in the new update information.

43. A representation of modifications to a set of data objects created by the method of claim 31.

44. A method of modifying a first set of data objects with data from a second set of data objects, comprising:
   segmenting at least one data object of a first set of data objects into two or more data blocks;
   comparing at least one checksum of a first data block to at least one checksum of at least one second data block to determine distinct data blocks;
   preparing at least one basis table comprising at least one entry corresponding to at least one distinct data block;
   determining at least one matching data block from a second set of data objects, wherein a matching data block comprises a data block of the second set of data objects that is substantially the same as one of the distinct data blocks of at least one basis table; and
   referencing at least one matching data block from the second set of data objects to a corresponding distinct data block of the first set of data objects to prepare a representation of the second set of data objects.

45. The method of claim 44, wherein the first set of data objects comprises one or more files stored in a non-modifiable memory.

46. The method of claim 44, wherein determining at least one matching data block comprises comparing at least one data block of the second set of data objects to at least one entry in at least one basis table to determine if at least one data block of the second set of data objects is the same as one of the distinct data blocks.

47. The method of claim 44, wherein determining at least one matching data block comprises determining whether at least one data object of the second set of data objects does not correspond to a data object of the first set of data objects.

48. The method of claim 44, wherein referencing at least one matching data block from the second set of data objects to a corresponding distinct data block of the first set of data objects comprises generating at least one delta table, wherein at least one delta table comprises at least one reference to at least one distinct data block of the first set of data objects corresponding to at least one matching data block of the second set of data objects.

49. The method of claim 48, wherein at least one delta table further comprises at least one reference to at least one data block of the second set of data objects that is not a matching data block.

50. The method of claim 44, wherein preparing a representation of the second set of data objects comprises preparing at least one file of modification data blocks comprising at least one data block of the second set of data objects that is not a matching data block.

51. The method of claim 44, wherein the first set of data objects comprises a file system hierarchy.

52. The method of claim 44, wherein the combination of the first set of data objects and the representation of the second set of data objects comprises data objects needed to generate contents of the second set of data objects, and data objects needed to construct a hierarchy of the second set of data objects.

53. The method of claim 44, wherein the second set of data objects comprises an update to the first set of data objects, and wherein the method further comprises determining whether at least one data object of the first set of objects is deleted in the second set of data objects.

54. The method of claim 44, further comprising providing data in response to a data access command, wherein the data is provided from a combination of the first set of data objects and the representation of the second set of data objects.

55. The method of claim 44, further comprising receiving a file structure query regarding the second set of data objects; and directing the file structure query to the representation of the second set of data objects.

56. A representation of a set of data objects created by the method of claim 44.

57. A method of modifying a first set of data objects with data from a second set of data objects, comprising:
   segmenting at least one data object of a first set of data objects into two or more data blocks;
   determining distinct data blocks from the first set of data objects, wherein determining distinct data blocks comprises, for at least two data blocks:
      determining an iterative checksum;
      determining a safe checksum; and
      determining whether the iterative checksum and the safe check sum of at least one data block match an iterative checksum and a safe checksum of at least one other data block;
   preparing at least one basis table comprising at least one entry corresponding to at least one distinct data block;
   determining at least one matching data block from a second set of data objects, wherein a matching data block comprises a data block of the second set of data objects that is substantially the same as one of the distinct data blocks of at least one basis table; and
   referencing at least one matching data block from the second set of data objects to a corresponding distinct data block of the first set of data objects to prepare a representation of the second set of data objects.

58. The method of claim 57, wherein the first set of data objects comprises one or more files stored in a non-modifiable memory.

59. The method of claim 57, wherein determining at least one matching data block comprises comparing at least one data block of the second set of data objects to at least one entry in at least one basis table to determine if at least one data block of the second set of data objects is the same as one of the distinct data blocks.

60. The method of claim 57, wherein determining at least one matching data block comprises determining whether at least one data object of the second set of data objects does not correspond to a data object of the first set of data objects.

61. The method of claim 57, wherein referencing at least one matching data block from the second set of data objects to a corresponding distinct data block of the first set of data objects comprises generating at least one delta table, wherein at least one delta table comprises at least one reference to at least one distinct data block of the first set of data objects corresponding to at least one matching data block of the second set of data objects.

62. The method of claim 61, wherein at least one delta table further comprises at least one reference to at least one data block of the second set of data objects that is not a matching data block.

63. The method of claim 57, wherein preparing a representation of the second set of data objects comprises preparing at least one file of modification data blocks comprising at least one data block of the second set of data objects that is not a matching data block.

64. The method of claim 57, wherein the first set of data objects comprises a file system hierarchy.

65. The method of claim 57, wherein the combination of the first set of data objects and the representation of the second set of data objects comprises data objects needed to generate contents of the second set of data objects, and data objects needed to construct a hierarchy of the second set of data objects.

66. The method of claim 57, wherein the second set of data objects comprises an update to the first set of data objects, and wherein the method further comprises determining whether at least one data object of the first set of objects is deleted in the second set of data objects.

67. The method of claim 57, further comprising providing data in response to a data access command, wherein the data is provided from a combination of the first set of data objects and the representation of the second set of data objects.

68. The method of claim 57, further comprising receiving a file structure query regarding the second set of data objects; and directing the file structure query to the representation of the second set of data objects.

69. A representation of a set of data objects created by the method of claim 57.

70. A method of modifying a first set of data objects with data from a second set of data objects, comprising:
   generating at least one basis table, wherein at least one basis table comprises a basis index table comprising a location, a size, and a checksum value for at least one distinct data block of a first set of data objects;
   determining at least one matching data block from a second set of data objects, wherein a matching data block comprises a data block of the second set of data objects that is substantially the same as one of the distinct data blocks of at least one basis table; and
   referencing at least one matching data block from the second set of data objects to a corresponding distinct data block of the first set of data objects to prepare a representation of the second set of data objects.

71. The method of claim 70, wherein the first set of data objects comprises one or more files stored in a non-modifiable memory.

72. The method of claim 70, wherein determining at least one matching data block comprises comparing at least one data block of the second set of data objects to at least one entry in at least one basis table to determine if at least one data block of the second set of data objects is the same as one of the distinct data blocks.

73. The method of claim 70, wherein determining at least one matching data block comprises determining whether at least one data object of the second set of data objects does not correspond to a data object of the first set of data objects.

74. The method of claim 70, wherein referencing at least one matching data block from the second set of data objects to a corresponding distinct data block of the first set of data objects comprises generating at least one delta table, wherein at least one delta table comprises at least one reference to at least one distinct data block of the first set of data objects corresponding to at least one matching data block of the second set of data objects.

75. The method of claim 74, wherein at least one delta table further comprises at least one reference to at least one data block of the second set of data objects that is not a matching data block.

76. The method of claim 70, wherein preparing a representation of the second set of data objects comprises preparing at least one file of modification data blocks comprising at least one data block of the second set of data objects that is not a matching data block.

77. The method of claim 70, wherein the first set of data objects comprises a file system hierarchy.

78. The method of claim 70, wherein the combination of the first set of data objects and the representation of the second set of data objects comprises data objects needed to generate contents of the second set of data objects, and data objects needed to construct a hierarchy of the second set of data objects.

79. The method of claim 70, wherein the second set of data objects comprises an update to the first set of data objects, and wherein the method further comprises determining whether at least one data object of the first set of objects is deleted in the second set of data objects.

80. The method of claim 70, further comprising providing data in response to a data access command, wherein the data is provided from a combination of the first set of data objects and the representation of the second set of data objects.

81. The method of claim 70, further comprising receiving a file structure query regarding the second set of data objects; and directing the file structure query to the representation of the second set of data objects.

82. A representation of a set of data objects created by the method of claim 70.

83. A method of modifying a first set of data objects with data from a second set of data objects, comprising:
   storing at least one checksum for at least one distinct data block from a first set of data objects in at least one basis table;
   determining an iterative checksum for at least one data block of a second set of data objects;
   determining whether the iterative checksum for at least one data block of the second set of data objects matches an iterative checksum in at least one basis table, wherein a matching data block comprises a data block of the second set of data objects that is substantially the same as one of the distinct data blocks of at least one basis table; and
   referencing at least one matching data block from the second set of data objects to a corresponding distinct data block of the first set of data objects to prepare a representation of the second set of data objects.

84. The method of claim 83, wherein the first set of data objects comprises one or more files stored in a non-modifiable memory.

85. The method of claim 83, wherein referencing at least one matching data block from the second set of data objects to a corresponding distinct data block of the first set of data objects comprises generating at least one delta table, wherein at least one delta table comprises at least one reference to at least one distinct data block of the first set of data objects corresponding to at least one matching data block of the second set of data objects.

86. The method of claim 85, wherein at least one delta table further comprises at least one reference to at least one data block of the second set of data objects that is not a matching data block.

87. The method of claim 83, wherein preparing a representation of the second set of data objects comprises preparing at least one file of modification data blocks comprising at least one data block of the second set of data objects that is not a matching data block.

88. The method of claim 83, wherein the first set of data objects comprises a file system hierarchy.

89. The method of claim 83, wherein the combination of the first set of data objects and the representation of the second set of data objects comprises data objects needed to generate contents of the second set of data objects, and data objects needed to construct a hierarchy of the second set of data objects.

90. The method of claim 83, wherein the second set of data objects comprises an update to the first set of data objects, and wherein the method further comprises determining whether at least one data object of the first set of objects is deleted in the second set of data objects.

91. The method of claim 83, further comprising providing data in response to a data access command, wherein the data is provided from a combination of the first set of data objects and the representation of the second set of data objects.

92. The method of claim 83, further comprising receiving a file structure query regarding the second set of data objects; and directing the file structure query to the representation of the second set of data objects.

93. A representation of a set of data objects created by the method of claim 83.

94. A method of modifying a first set of data objects with data from a second set of data objects, comprising:
- storing at least one checksum for at least one distinct data block from a first set of data objects in at least one basis table;
- determining an iterative checksum for at least one data block of a second set of data objects;
- determining whether the iterative checksum for at least one data block of the second set of data objects matches an iterative checksum in at least one basis table;
- comparing a safe checksum for at least one data block of the second set of data objects with an safe checksum that matches an iterative checksum of at least one basis table;
- determining whether the safe checksum for at least one data block of the second set of data objects matches a safe checksum corresponding to the matched iterative checksum in at least one basis table; and
- referencing at least one matching data block from the second set of data objects to a corresponding distinct data block of the first set of data objects to prepare a representation of the second set of data objects, wherein a matching data block comprises a data block of the second set of data objects that is substantially the same as one of the distinct data blocks of at least one basis table.

95. The method of claim 94, wherein the first set of data objects comprises one or more files stored in a non-modifiable memory.

96. The method of claim 94, wherein referencing at least one matching data block from the second set of data objects to a corresponding distinct data block of the first set of data objects comprises generating at least one delta table, wherein at least one delta table comprises at least one reference to at least one distinct data block of the first set of data objects corresponding to at least one matching data block of the second set of data objects.

97. The method of claim 96, wherein at least one delta table further comprises at least one reference to at least one data block of the second set of data objects that is not a matching data block.

98. The method of claim 94, wherein preparing a representation of the second set of data objects comprises preparing at least one file of modification data blocks comprising at least one data block of the second set of data objects that is not a matching data block.

99. The method of claim 94, wherein the first set of data objects comprises a file system hierarchy.

100. The method of claim 94, wherein the combination of the first set of data objects and the representation of the second set of data objects comprises data objects needed to generate contents of the second set of data objects, and data objects needed to construct a hierarchy of the second set of data objects.

101. The method of claim 94, wherein the second set of data objects comprises an update to the first set of data objects, and wherein the method further comprises determining whether at least one data object of the first set of objects is deleted in the second set of data objects.

102. The method of claim 94, further comprising providing data in response to a data access command, wherein the data is provided from a combination of the first set of data objects and the representation of the second set of data objects.

103. The method of claim 94, further comprising receiving a file structure query regarding the second set of data objects; and directing the file structure query to the representation of the second set of data objects.

104. A representation of a set of data objects created by the method of claim 94.

105. A method of modifying a first set of data objects with data from a second set of data objects, comprising:
- generating at least one basis table identifying distinct data blocks from a first set of data objects;
- determining at least one matching data block from a second set of data objects, wherein a matching data block comprises a data block of the second set of data objects that is substantially the same as one of the distinct data blocks of at least one basis table;
- referencing at least one matching data block from the second set of data objects to a corresponding distinct data block of the first set of data objects;
- preparing at least one file of modification data blocks comprising at least one data block of the second set of data objects that is not a matching data block;
- preparing at least one delta look up table entry comprising at least one reference to at least one data block in at least one file of modification data blocks; and
- preparing at least one delta look up table entry comprising at least one reference to at least one data block of the first set of data objects;
- wherein two or more of the referenced data blocks are combinable to generate the second set of data objects.

106. The method of claim 105, wherein the first set of data objects comprises one or more files stored in a non-modifiable memory.

107. The method of claim 105, wherein determining at least one matching data block comprises comparing at least one data block of the second set of data objects to at least one entry in at least one basis table to determine if at least one data block of the second set of data objects is the same as one of the distinct data blocks.

108. The method of claim 105, wherein determining at least one matching data block comprises determining whether at least one data object of the second set of data objects does not correspond to a data object of the first set of data objects.

109. The method of claim 105, wherein the first set of data objects comprises a file system hierarchy.

110. The method of claim 105, wherein the combination of the first set of data objects and the representation of the second set of data objects comprises data objects needed to generate contents of the second set of data objects, and data objects needed to construct a hierarchy of the second set of data objects.

111. The method of claim 105, wherein the second set of data objects comprises an update to the first set of data objects, and wherein the method further comprises determining whether at least one data object of the first set of objects is deleted in the second set of data objects.

112. The method of claim 105, further comprising providing data in response to a data access command, wherein the data is provided from a combination of the first set of data objects and the representation of the second set of data objects.

113. The method of claim 105, further comprising receiving a file structure query regarding the second set of data objects; and directing the file structure query to the representation of the second set of data objects.

114. A representation of a set of data objects created by the method of claim 105.

115. A method of modifying a first set of data objects with data from a second set of data objects, comprising:

generating at least one basis table identifying distinct data blocks from a first set of data objects;

determining at least one matching data block from a second set of data objects, wherein a matching data block comprises a data block of the second set of data objects that is substantially the same as one of the distinct data blocks of at least one basis table;

referencing at least one matching data block from the second set of data objects to a corresponding distinct data block of the first set of data objects to prepare a representation of the second set of data objects;

receiving a data access command requesting data from the second set of data objects; and directing the data access command to the representation of the second set of data objects.

116. The method of claim 115, wherein generating at least one basis table comprises:

segmenting at least one data object of the first set of data objects into two or more data blocks;

determining distinct data blocks from the first set of data objects; and preparing at least one basis table comprising at least one entry corresponding to at least one distinct data block.

117. The method of claim 116, wherein determining distinct data blocks comprises comparing at least one checksum of a first data block to at least one checksum of at least one second data block.

118. The method of claim 116, wherein determining distinct data blocks comprises:

for at least two data blocks:
    determining an iterative checksum;
    determining a safe checksum; and
    determining whether the iterative checksum and the safe check sum of at least one data block match an iterative checksum and a safe checksum of at least one other data block.

119. The method of claim 115, wherein the first set of data objects comprises one or more files stored in a non-modifiable memory.

120. The method of claim 115, wherein at least one basis table comprises a basis index table comprising at least one entry for at least one distinct data block of the first set of data objects.

121. The method of claim 120, wherein at least one entry in a basis index table comprise a location, a size, and a checksum value for at least one distinct data block.

122. The method of claim 118, wherein at least one basis table comprises a basis directory entry meta-data table comprising at least one entry for at least one data object of the first set of data objects.

123. The method of claim 122, wherein at least one entry in a basis directory entry meta-data table comprises meta-data for at least one data object of the first set of data objects.

124. The method of claim 118, wherein a distinct data block comprises a data block containing data that is not the same as data contained in any other data block of the first set of data objects.

125. The method of claim 118, wherein a distinct data block comprises a single data block that represents all other data blocks that are identical in content.

126. The method of claim 118, wherein a data block comprises a portion of data from a data object having a determined length.

127. The method of claim 118, wherein determining at least one matching data block comprises comparing at least one data block of the second set of data objects to at least one entry in at least one basis table to determine if at least one data block of the second set of data objects is the same as one of the distinct data blocks.

128. The method of claim 118, wherein generating at least one basis table comprises storing at least one checksum for at least one distinct data block in at least one basis table, and wherein determining matching data blocks comprises:

determining an iterative checksum for at least one data block of the second set of data objects; and determining whether the iterative checksum for at least one data block of the second set of data objects matches an iterative checksum in at least one basis table.

129. The method of claim 128, wherein determining matching data blocks further comprises:

for at least one data block of the second set of data objects with an iterative checksum that matches an iterative checksum of at least one basis table:
    determining a safe checksum for the data block of the second set of data objects; and
    determining whether the safe checksum for the data block of the second set of data objects matches a safe checksum corresponding to the matched iterative checksum in at least one basis table.

130. The method of claim 115, wherein determining at least one matching data block comprises determining whether at least one data object of the second set of data objects does not correspond to a data object of the first set of data objects.

131. The method of claim 115, wherein referencing at least one matching data block from the second set of data objects to a corresponding distinct data block of the first set of data objects comprises generating at least one delta table, wherein at least one delta table comprises at least one reference to at least one distinct data block of the first set of data objects corresponding to at least one matching data block of the second set of data objects.

132. The method of claim 131, wherein at least one delta table further comprises at least one reference to at least one data block of the second set of data objects that is not a matching data block.

133. The method of claim 115, wherein preparing a representation of the second set of data objects comprises preparing at least one file of modification data blocks comprising at least one data block of the second set of data objects that is not a matching data block.

134. The method of claim 115, wherein preparing a representation of the second set of data objects comprises:

preparing at least one file of modification data blocks comprising at least one data block of the second set of data objects that is not a matching data block;

preparing at least one delta look up table entry comprising at least one reference to at least one data block in at least one file of modification data blocks; and preparing at least one delta look up table entry comprising at least one reference to at least one data block of the first set of data objects;

wherein two or more of the referenced data blocks are combinable to generate the second set of data objects.

135. The method of claim 115, wherein the first set of data objects comprises a file system hierarchy.

136. The method of claim 115, wherein the first set of data objects comprises a file system hierarchy, wherein the second set of data objects comprises a file system hierarchy, and wherein preparing a representation of the second set of data objects comprises preparing at least one delta directory map file comprising at least one difference between the file system hierarchies of the first and second sets of data objects.

137. The method of claim 115, wherein the first set of data objects comprises a file system hierarchy, wherein the second set of data objects comprises a file system hierarchy, wherein preparing a representation of the second set of data objects comprises preparing at least one delta directory map file comprising at least one difference between the file system hierarchies of the first and second sets of data objects, and wherein at least one delta directory map file and the file system hierarchy of the first set of data objects are combinable to generate the file system hierarchy of the second set of data objects.

138. The method of claim 115, wherein the combination of the first set of data objects and the representation of the second set of data objects comprises data objects needed to generate contents of the second set of data objects, and data objects needed to construct a hierarchy of the second set of data objects.

139. The method of claim 115, wherein the second set of data objects comprises an update to the first set of data objects, and wherein the method further comprises determining whether at least one data object of the first set of objects is deleted in the second set of data objects.

140. The method of claim 115, wherein the second set of data objects comprises an update to the first set of data objects, and wherein the method further comprises:
  generating at least one basis directory entry meta-data table comprising meta-data for at least one data object of the first set of data objects;
  generating at least one delta directory entry meta-data table comprising meta-data for at least one data object of the second set of data objects;
  determine whether at least one data object of the first set of data objects is absent from the second set of data objects; and
  if a data object of the first set of data objects is absent from the second set of data objects, adding an entry to at least one delta directory entry meta-data table for the absent data object indicating that the data object is deleted.

141. The method of claim 115, further comprising providing data in response to a data access command, wherein the data is provided from a combination of the first set of data objects and the representation of the second set of data objects.

142. The method of claim 115, further comprising receiving a file structure query regarding the second set of data objects; and directing the file structure query to the representation of the second set of data objects.

143. A representation of a set of data objects created by the method of claim 115.

144. A method of modifying a first set of data objects with data from a second set of data objects, comprising:
  generating at least one basis table identifying distinct data blocks from a first set of data objects;
  determining at least one matching data block from a second set of data objects, wherein a matching data block comprises a data block of the second set of data objects that is substantially the same as one of the distinct data blocks of at least one basis table;
  referencing at least one matching data block from the second set of data objects to a corresponding distinct data block of the first set of data objects to prepare a representation of the second set of data objects; and
  providing data in response to a data access command, wherein the data is provided from a combination of the first set of data objects and the representation of the second set of data objects.

145. The method of claim 144, wherein the first set of data objects comprises one or more files stored in a non-modifiable memory.

146. The method of claim 144, wherein determining at least one matching data block comprises comparing at least one data block of the second set of data objects to at least one entry in at least one basis table to determine if at least one data block of the second set of data objects is the same as one of the distinct data blocks.

147. The method of claim 144, wherein determining at least one matching data block comprises determining whether at least one data object of the second set of data objects does not correspond to a data object of the first set of data objects.

148. The method of claim 144, wherein referencing at least one matching data block from the second set of data objects to a corresponding distinct data block of the first set of data objects comprises generating at least one delta table, wherein at least one delta table comprises at least one reference to at least one distinct data block of the first set of data objects corresponding to at least one matching data block of the second set of data objects.

149. The method of claim 148, wherein at least one delta table further comprises at least one reference to at least one data block of the second set of data objects that is not a matching data block.

150. The method of claim 144, wherein preparing a representation of the second set of data objects comprises preparing at least one file of modification data blocks comprising at least one data block of the second set of data objects that is not a matching data block.

151. The method of claim 144, wherein the first set of data objects comprises a file system hierarchy.

152. The method of claim 144, wherein the combination of the first set of data objects and the representation of the second set of data objects comprises data objects needed to generate contents of the second set of data objects, and data objects needed to construct a hierarchy of the second set of data objects.

153. The method of claim 144, wherein the second set of data objects comprises an update to the first set of data objects, and wherein the method further comprises determining whether at least one data object of the first set of objects is deleted in the second set of data objects.

154. A representation of a set of data objects created by the method of claim 144.

155. A method of modifying a first set of data objects with data from a second set of data objects, comprising:
  generating at least one basis table identifying distinct data blocks from a first set of data objects;
  determining at least one matching data block from a second set of data objects, wherein a matching data block comprises a data block of the second set of data objects that is substantially the same as one of the distinct data blocks of at least one basis table; and
  referencing at least one matching data block from the second set of data objects to a corresponding distinct data block of the first set of data objects to prepare a representation of the second set of data objects;

receiving a file structure query regarding the second set of data objects; and directing the file structure query to the representation of the second set of data objects.

156. The method of claim 155, wherein the first set of data objects comprises one or more files stored in a non-modifiable memory.

157. The method of claim 155, wherein determining at least one matching data block comprises comparing at least one data block of the second set of data objects to at least one entry in at least one basis table to determine if at least one data block of the second set of data objects is the same as one of the distinct data blocks.

158. The method of claim 155, wherein determining at least one matching data block comprises determining whether at least one data object of the second set of data objects does not correspond to a data object of the first set of data objects.

159. The method of claim 155, wherein referencing at least one matching data block from the second set of data objects to a corresponding distinct data block of the first set of data objects comprises generating at least one delta table, wherein at least one delta table comprises at least one reference to at least one distinct data block of the first set of data objects corresponding to at least one matching data block of the second set of data objects.

160. The method of claim 159, wherein at least one delta table further comprises at least one reference to at least one data block of the second set of data objects that is not a matching data block.

161. The method of claim 154, wherein preparing a representation of the second set of data objects comprises preparing at least one file of modification data blocks comprising at least one data block of the second set of data objects that is not a matching data block.

162. The method of claim 154, wherein the first set of data objects comprises a file system hierarchy.

163. The method of claim 154, wherein the combination of the first set of data objects and the representation of the second set of data objects comprises data objects needed to generate contents of the second set of data objects, and data objects needed to construct a hierarchy of the second set of data objects.

164. A representation of a set of data objects created by the method of claim 154.

* * * * *

UNITED STATES PATENT AND TRADEMARK OFFICE
CERTIFICATE OF CORRECTION

PATENT NO. : 6,604,236 B1
DATED : August 5, 2003
INVENTOR(S) : Draper et al.

It is certified that error appears in the above-identified patent and that said Letters Patent is hereby corrected as shown below:

Title page,
Item [75], Inventors, after "Stephen Peter Willis Draper", please delete "Hants (GB)" and substitute therefor -- Hampshire (GB) --.

Column 18,
Line 16, please delete "check sum" and substitute therefor -- "checksum" --.

Column 21,
Line 20, please delete "an safe" and substitute therefor -- "a safe" --.

Column 23,
Line 41, please delete "check sum" and substitute therefor -- "checksum" --.
Line 52, please delete "comprise" and substitute therefor -- "comprises" --.
Lines 54, 61 and 65, please delete "The method of claim 118" and substitute therefor -- "The method of claim 115" --.

Column 24,
Lines 1, 4 and 10, please delete "The method of claim 118" and substitute therefor -- "The method of claim 115" --.

Column 28,
Lines 7, 13, 15 and 22, please delete "The method of claim 154" and substitute therefor -- "The method of claim 155" --.

Signed and Sealed this

Eighteenth Day of October, 2005

JON W. DUDAS
*Director of the United States Patent and Trademark Office*